Dec. 28, 1954 V. TRUE ET AL 2,698,405
WIDE-RANGE, HIGH-VOLTAGE, VARIABLE CAPACITOR
Filed Oct. 31, 1951 2 Sheets-Sheet 1
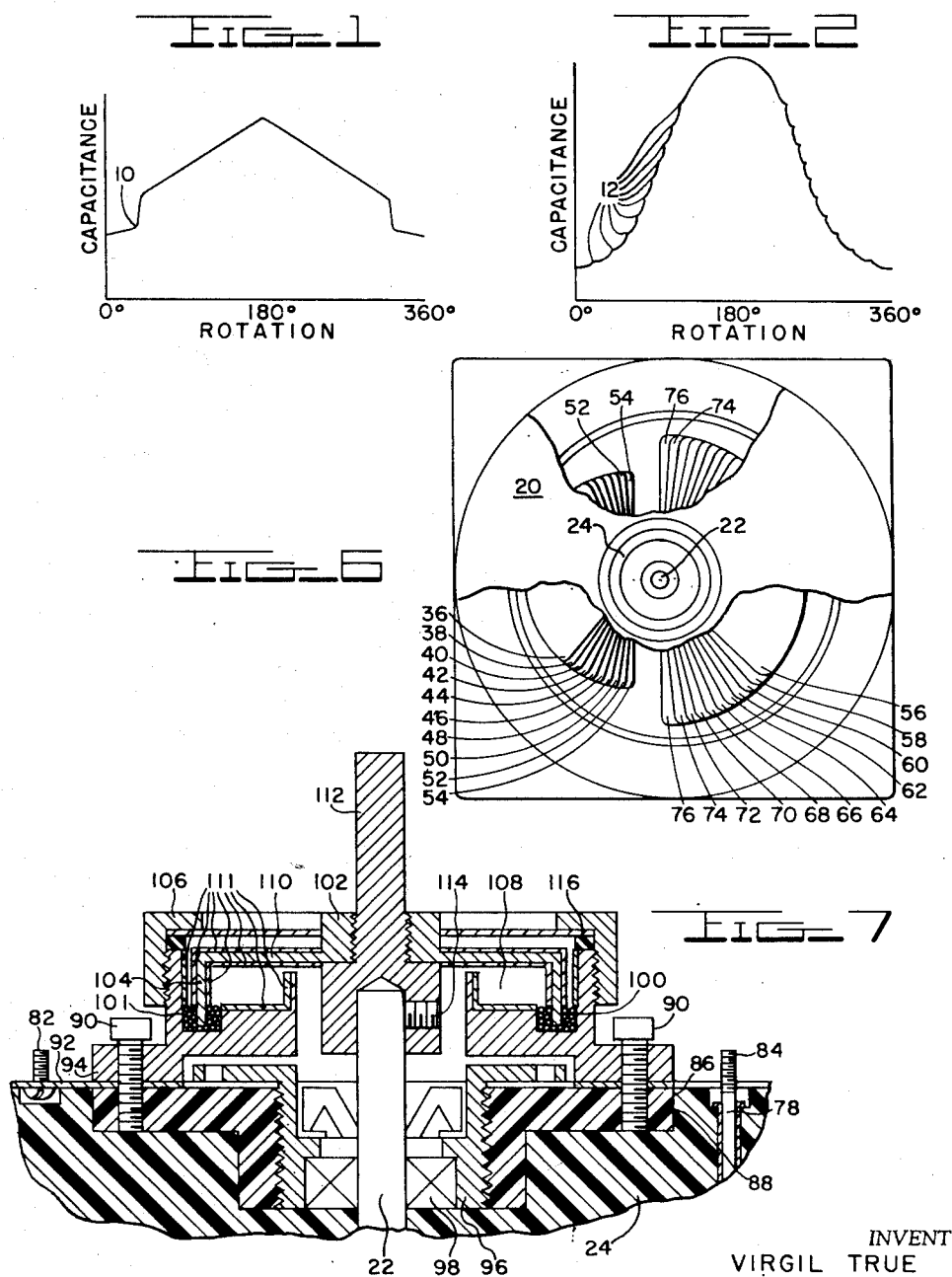
INVENTORS
VIRGIL TRUE
BERT FISK
CHARLES L. SPENCER
BY
ATTORNEYS Dec. 28, 1954 V. TRUE ET AL 2,698,405
WIDE-RANGE, HIGH-VOLTAGE, VARIABLE CAPACITOR
Filed Oct. 31, 1951 2 Sheets-Sheet 2
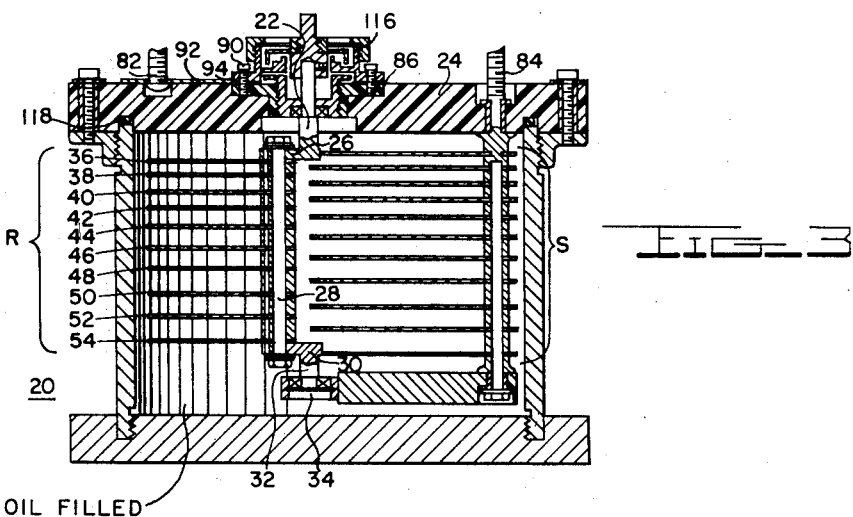
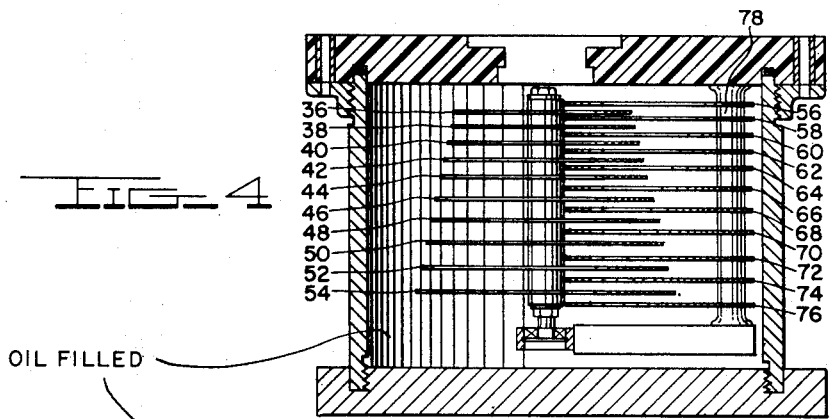
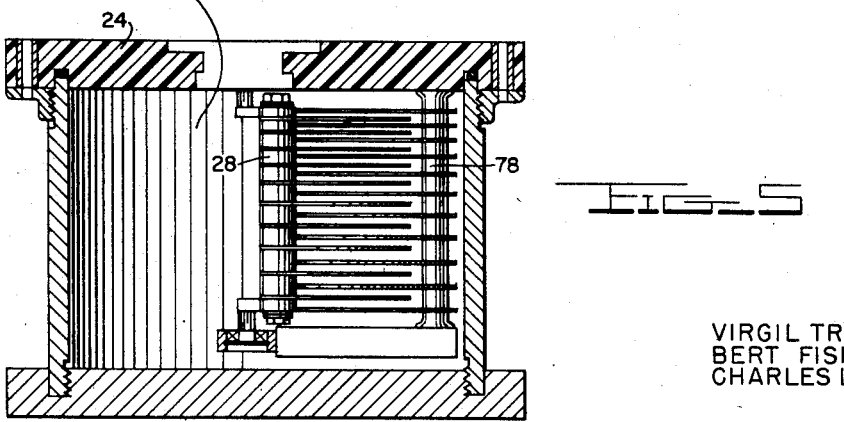
INVENTORS
VIRGIL TRUE
BERT FISK
CHARLES L. SPENCER
BY
ATTORNEYS

United States Patent Office

2,698,405
Patented Dec. 28, 1954

2,698,405

WIDE-RANGE, HIGH-VOLTAGE, VARIABLE CAPACITOR

Virgil True and Bert Fisk, Washington, D. C., and Charles L. Spencer, Alexandria, Va.

Application October 31, 1951, Serial No. 254,182

6 Claims. (Cl. 317—253)

(Granted under Title 35, U. S. Code (1952), sec. 266)

This invention relates to an improved variable capacitor, and in particular to a high voltage capacitor operable to produce a smooth rate of change in capacity with rotation of the rotor element.

Previous efforts to devise a variable capacitor having a high maximum capacity as well as a wide range between maximum and minimum capacities have not been very successful due mainly to a sharp initial surge of capacity when the plates of the rotor of a standard condenser are first brought into alignment with the stator plates. After this initial surge of capacity, the additional rotation of the rotor plates causes a linear increase in capacity with additional rotation. This has resulted in a "break" in the range of resonant frequencies that is obtainable with circuits comprising prior art variable capacitors. In addition to this break in the resonant frequencies derived from the prior art devices, the range of capacitances obtainable with these devices is quite limited.

Therefore, it is an object of this invention to provide a variable capacitor capable of providing a smooth rate of change in capacity with rotation of the rotor elements of the capacitor over a wide range of capacities.

It is another object of this invention to provide a variable capacitor that may be continuously variable over a wide tuning range and which provides a smooth curve of capacity change versus rotation over the entire capacity range.

A still further object is to provide a small, compact condenser that has a high voltage rating and a low loss factor.

Another object of this invention is to provide a variable capacitor that is resistant to shock and vibration.

It is another object to provide a variable capacitor that requires a small torque to operate its rotor and that readily lends itself to operation in a servo drive mechanism.

Another object is to provide a variable capacitor which is provided with a rotor shaft having a special electrical contact that has a high current carrying capacity, no loss, and a long contact life.

These and other objects will be apparent from the following description of an embodiment taken in conjunction with the accompanying drawings wherein:

Figure 1 represents a typical curve showing the change of capacity upon rotation of a rotor with respect to a stator in a capacitor typical of the prior art, Figure 2 represents a typical curve similar to that of Figure 1 but showing the capacitance-rotation curve for applicants' improved capacitor, Figure 3 is a cross sectional view of an embodiment of the invention looking from a side of the capacitor wherein the rotor plates are completely out of mesh with the stator plates, Figure 4 is a side cutaway view of the embodiment of Figure 3 wherein the rotor plates are in partial mesh with the stator plates, Figure 5 is a view similar to that of Figure 4 wherein the rotor plates are in complete mesh with the stator plates, Figure 6 is a plan view from the top partially broken away to show the arrangement of the various plates in the stator and rotor of the improved device, and Figure 7 is an expanded cross-sectional view of a portion of Figure 3.

As will be explained in further detail below, applicants' capacitor provides a gradually increased capacitance upon rotation of the rotor elements with respect to the stator elements by providing a set of rotor elements and a matching set of stator elements of varying surface areas. The rotor elements are meshed one at a time with the respective stator elements, the largest pair of stator and rotor elements being brought into partial alignment first. This alignment is gradually increased while additional elements are meshed in the order of size until all the elements are in complete mesh thereby producing the maximum capacitance possible for the capacitor.

The provision of varying sized rotor and stator plates minimizes the effect of the sudden increase in capacitance obtained in conventional capacitors at the moment the stator and rotor elements begin to mesh. In lieu of the sudden increase of capacitance at point 10 on the rotation cycle of a typical prior art capacitor as shown in the chart depicted in Figure 1, a series of small steps in capacitance increase is provided at a plurality of mesh points 12 which coincide with the points on the rotation cycle at which each pair of plates of applicants' improved capacitor first comes into mesh. The chart embodied in Figure 2 shows a typical curve illustrating the smoothness with which the capacity of applicants' improved condenser varies with rotation due to the provision of a plurality of small increases in capacitance in applicants' device rather than the one large increase characteristic of prior art devices.

A typical embodiment of the present invention is shown in Figures 3–6 wherein the several reference numerals are applied to identical elements of the improved capacitor.

In this embodiment, the improved capacitor is represented by numeral 20. This capacitor as herein exemplified is cylindrically shaped and provided with a rotatable shaft 22 which extends through a cover 24 located at the top end of the capacitor and is adapted to be coupled to a servo motor (not disclosed). Interiorly of the condenser, shaft 22 is provided with an arm 26 which extends perpendicularly to the shaft. An offset arm 28 extending downwardly from arm 26 and parallel to the axis of shaft 22 is coupled via arm 30 and stub shaft 32 to a bearing 34 located on the longitudinal cylindrical axis near the base of the capacitor 20. Extending transversely from offset arm 28 are a series of spaced, sector-shaped plates 36, 38, 40, 42, 44, 46, 48, 50, 52 and 54 which comprise the moving elements of rotor R. These plates are arranged as illustrated in the figures from top to bottom within capacitor 20 in the order of size with the smallest plate 36 subtending an arc of 99 degrees. Plate 54 located nearest the bottom of the capacitor subtends an arc of 180 degrees. The intermediate plates subtend arcs which increase by uniform steps from top to bottom. The arcs subtended by each set of plates comprising rotor R and stator S are defined by equal radii. Stator S comprises a complementary set of spaced sector-shaped plates 56, 58, 60, 62, 64, 66, 68, 70, 72, 74 and 76 which extend transversely from securing pole 78 in a manner similar to the manner by which the rotor plates extend from off-set arm 28. The rotor and stator plates are so spaced that when the rotor plates are interleaved with the stator plates, the spacing between adjacent rotor and stator plates increases as a function of the size of the plates. As depicted in the drawing the spacing between plates increases gradually from top to bottom thereby providing an equal capacitance between any pair of adjacent rotor-stator plate surfaces, since the capacitance of a simple two plate condenser varies directly with the effective area between the surfaces and inversely with the distance between the surfaces. Thus the smaller plates are intermeshed more closely than the larger plates in such a manner that the spacing effect on the individual capacitances balances the effect due to the size of the adjacent plates.

This is accomplished by keeping the spacing-surface area ratio constant. This provision not only results in the addition of capacitors of equal capacity connected in parallel, but also enables the device to be used at the highest possible voltage without causing a voltage breakdown between any single pair of adjacent meshed plates.

While the embodiment shown provides 10 rotor plates and 11 stator plates and the variation in size between adjacent plates in each bank is uniformly set at 9 degrees in arc, it is understood that the banks may be provided with various numbers of plates varying the subtended arc between a minimum and 180 degrees by a uniform amount. It is recognized that the greater the number of steps, the smoother is the capacity-rotation curve for the condenser. The number and spacing of the plates may be modified depending on the voltage requirements for the capacitor.

The case of the improved capacitor 20 is composed of a material that is sturdy such as polished steel or a shock resistant plastic such as polytrifluorochloroethylene, known by the trade name of "Kel–F." The cover 24 must be formed of a sturdy non-conducting material to insure that rotor electrode 82 is insulated from stator electrode 84.

It has been conventional in the past to use a vacuum space between condenser plates in order to provide a wide range variable condenser because of the low loss factor present. The use of a vacuum requires a construction of the capacitor that is similar to a Dewar type of flask and therefore is very fragile. The present invention contemplates the use of oil as a dielectric. In particular, silicone oils have been found to be well suited for use as a dielectric. Some examples are shown in the U. S. patent to Hyde, No. 2,377,689. Other examples well suited for this purpose are methyl phenyl silicone, dimethyl silicone, polymethylsiloxane or polymerized methyl silicone, known also by the trade name of Dow Corning Fluid #200. Oil filled capacitors presently used have a fixed capacity. The use of oil as a filler within the capacitor has the advantage of damping out mechanical vibrations inherent in variable capacitors as well as providing a low loss factor that approaches the efficiency obtained with the use of a vacuum dielectric.

Attention is now directed to Figures 3, 4 and 5 in order to emphasize the operation of the improved capacitor 20. In Figure 3, the rotor plates are shown to be completely out of mesh with the stator plates. The fact that the rotor plates are mounted on the offset arm 28 in eccentric relation with respect to the axis of rotation as represented by shaft 22, extension 32 and bearing 34 tends to separate the stator and rotor plates even further and minimizes any fringe capacitance effects that may tend to be present.

In Figure 4, the rotor plates are shown in partial alignment with the stator plates after having been rotated slightly in a counter-clockwise direction looking down at the device from above. Rotor plate 54 is shown to be in greatest alignment with the upper surface of stator plate 76 and the lower surface of stator plate 74. The upper rotor plates have come into least mesh with the stator plates. Note that the offset arm 28 is now in a position where the vertical alignment of the stator and rotor plates are more nearly coincident.

In Figure 5, maximum alignment of the rotor and stator plates has been reached. The rotor plates and the offset arm 28 are now 180 degrees out of phase with the position shown in Figure 3. It is noted that the rotor plates are now free to continue their rotation in the counter-clockwise direction since the stator plates are cut out in the center to allow the offset arm 28 to make a complete revolution. Thus, the capacitor may be operated directly by a servo motor. Many present type variable capacitors of the rotary type require a reversal of direction by the moving element when it is desired to lower the capacitance from the point of maximum capacitance, thereby requiring the use of a more complicated driving mechanism than a simple servo motor.

The plan view of Figure 6 shows the arrangement of the rotor and stator plates when the improved capacitor is in the position depicted in Figure 3. The leading and trailing edges of rotor and stator plates can be seen to be staggered, thereby rendering the capacitor fully reversible.

In order to provide electrical contact between the fixed terminal 82 and the rotor plates, the device shown in detail in Figure 7 is used. A recess 86 is provided in cover 24 of the capacitor 20. An internally threaded bushing 88 preferably of plastic is inserted in recess 86. Cap screws 90 are used to hold plate 92 and cup member 94 in secure alignment with the cover 24.

Cup member 94 is provided with a circular groove 100 which is designed to be filled with mercury 101 (shown in Figure 7 as bubbles) thereby providing a loss free contact between an internally threaded metal dipper 102 comprising a downwardly directed circular skirt 104 and the cup member 94. A direct electric connection between binding post 82 and the rotor plates is provided via metal strap 92, cup member 94, mercury 101, dipper 102, shaft 112, rotatable shaft 22, flange 26 and offset arm 28 to the rotor plates.

Cup member 94 is provided with external threads. A dust cover 106 is provided with internal threads whereby the cup member and dust cover are engaged to form a chamber 108 in which dipper 102 is centered.

In order to insure that the mercury remains in the groove 100, thereby maintaining electrical contact between cup member 94 and skirt 104 of dipper 102, the surfaces of groove 100 and the lower end of flange 104 are composed of a material that is "wet" by mercury, such as bronze or Navy brass, while the upper portion of the surfaces of chamber 108 are plated with nickel surfaces 111, which latter are not "wet" by mercury, in the manner shown in Figure 7. Hence, any mercury which may tend to splash from the groove is repelled from the upper portions of chamber 108 toward groove 100, thereby maintaining electrical contact between cup member 94 and dipper 102.

Shaft 22 is coupled to rotor shaft 112 via a screw 114. This enables the rotor plates to be directly responsive to any rotation of rotor shaft 112 caused by a servo motor (not shown). Gaskets 116 and 118 (Figure 3) serve to prevent dust from entering chamber 108 and the oil chamber of capacitor 20 respectively.

While a specific embodiment has been described, it is understood that the scope of the present invention is limited only by the appended claims.

The invention described herein may be manufactured and used by or for the Government of the United States of America for governmental purposes without the payment of any royalties thereon or therefor.

What is claimed is:

1. A variable capacitor comprising a cylindrically shaped body, a dielectric material within said body, a set of variously sized and variously spaced stator elements within said body, a set of variously sized and various spaced rotor elements within said body, both sets of elements having staggered leading edges, a cover secured to said body, a plurality of terminals secured to said cover, a first electrical conduction path to provide electrical connection between said stator elements and one of said terminals, a second electrical conduction path to provide electrical connection between said rotor elements and another of said terminals, said second electrical conduction path comprising an arm connecting all the rotor elements in parallel and adapted to be rotated about the longitudinal axis of the cylindrically shaped body, means to mesh said rotor elements between said stator elements, said means comprising a pivot bearing along the axis of said body, means connecting said arm at one end to the pivot bearing, means connecting the other end of said arm to a rotatable shaft, a flanged metal dipper mechanically and electrically coupled to said rotatable shaft, said flanged metal dipper being provided with a nickel coating over most of its surface, a stationary cup member attached to the cover, a circular groove in said cup member, mercury overflowing said circular groove, the portion of said flanged metal dipper not covered with a coating of nickel being in metal contact with said mercury, a plate connected between said cup member and said other terminal, said flanged metal dipper and the cup member being formed of a material to which mercury is adherent.

2. A variable high voltage capacitor which comprises a first plurality of parallel plates and a second plurality of parallel plates disposed to intermesh with the first plurality of plates, each plate in said second plurality of plates with the exception of one having a surface area smaller than an adjacent plate and each variably spaced relative to its respective plates in said first plurality in proportion to its surface area, the leading edges in said second plurality of plates being staggered to permit the gradual intermeshing of the plates in the order of their surface area.

3. The combination as claimed in claim 2 in which the spacing of the plates of the second plurality of plates in relation to the respective plates in said first plurality is effective to produce the same maximum intersurface capacity between the adjacent plates of the first and second pluralities of plates.

4. A variable high voltage capacitor which comprises a plurality of rigidly mounted parallel plates and a plurality of movable parallel plates disposed to intermesh with the rigidly mounted parallel plates, each of said movable plates with the exception of one having a surface area smaller than an adjacent plate and each variably spaced relative to its respective rigidly mounted plates in proportion to its surface area, the leading and trailing edges in said plurality of movable plates being regularly staggered to permit the gradual intermeshing of the plates in the order of their surface area.

5. The combination as claimed in claim 4 including a cylindrical shaped housing containing a viscous dielectric, said housing substantially enclosing said high voltage capacitor.

6. A variable high voltage capacitor which comprises a first plurality of parallel plates and a second plurality of parallel plates disposed to intermesh with the first plurality of plates, each plate in said second plurality being variably spaced relative to its respective plate in said first plurality of plates, the plates in at least one of said pluralities being staggered to permit the gradual intermeshing of the plates in the order of their spacing.

References Cited in the file of this patent

UNITED STATES PATENTS

| Number | Name | Date |
|---|---|---|
| Re. 23,368 | Grob | May 22, 1951 |
| 1,258,423 | Lowenstein | Mar. 5, 1918 |
| 1,604,508 | Zisch | Oct. 26, 1926 |
| 1,641,945 | Murray | Sept. 6, 1927 |
| 1,743,870 | Snell | Jan. 14, 1930 |

FOREIGN PATENTS

| Number | Country | Date |
|---|---|---|
| 425,329 | Great Britain | Mar. 12, 1935 |
| 464,254 | Great Britain | Apr. 14, 1937 |